US012579867B2

(12) United States Patent
Nelson

(10) Patent No.: US 12,579,867 B2
(45) Date of Patent: Mar. 17, 2026

(54) TRADING AND SELLING EARNED BONUS GAMES

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 318 days.

(21) Appl. No.: 18/329,079

(22) Filed: Jun. 5, 2023

(65) Prior Publication Data

US 2024/0404366 A1 Dec. 5, 2024

(51) Int. Cl.

*G07F 17/32* (2006.01)
*G06Q 30/08* (2012.01)
*G06Q 50/34* (2012.01)

(52) U.S. Cl.

CPC ......... *G07F 17/3267* (2013.01); *G06Q 30/08* (2013.01); *G06Q 50/34* (2013.01); *G07F 17/3225* (2013.01); *G07F 17/3244* (2013.01)

(58) Field of Classification Search

CPC .... G07F 17/32; G07F 17/323; G07F 17/3244; G07F 17/3255; G07F 17/326; G07F 17/3267; G07F 17/3281; G07F 17/34

See application file for complete search history.

(56) References Cited

U.S. PATENT DOCUMENTS 6,386,975 B1 * 5/2002 Peterson ............. A63F 3/00157 463/16
7,857,699 B2 * 12/2010 Baerlocher ......... G07F 17/3244 463/27
8,157,642 B2 * 4/2012 Paulsen .................. G07F 17/32 463/25
10,089,828 B2 * 10/2018 Nelson .................... G07F 17/34
2006/0217173 A1 * 9/2006 Walker ................ G07F 17/3234 463/16
2009/0156280 A1 * 6/2009 Sweary ............... G07F 17/3295 463/13
2010/0041470 A1 * 2/2010 Preisach ............. G07F 17/3279 463/25
2010/0130276 A1 * 5/2010 Fiden ..................... G06Q 50/34 463/43
2014/0256407 A1 * 9/2014 Graf .................... G07F 17/3218 463/22
2022/0292926 A1 * 9/2022 Wang .................. G07F 17/3269

* cited by examiner

*Primary Examiner* — Milap Shah

(74) *Attorney, Agent, or Firm* — Issue Fee Transmittal

(57) ABSTRACT

A gaming device includes an input device, a processor circuit and a memory including machine-readable instructions that, when executed by the processor circuit, cause the processor circuit to per perform operations. Operations include receiving from a first player, a wager for a wagering game at an electronic gaming machine (EGM), receiving an indication that the first player of the EGM has won multiple bonus game plays, receiving, from the first player, an offer to sell a portion of the bonus game plays, and receiving an acceptance message from a second player indicating that the second player will buy the portion of the bonus game plays. Operations further include, responsive to receiving the acceptance message, transferring the portion of the bonus game plays to the second player.

18 Claims, 14 Drawing Sheets

800 810 820 830

| Current Offers | | |
|---|---|---|
| Description | Terms | Price |
| Celebrity A's Christmas Frenzy | 100 Spins at Game at $1.00 | $5,000 |
| Celebrity A's Christmas Frenzy | 100 Spins at Game at $1.00 | $5,000 |
| Celebrity A's Christmas Frenzy | 100 Spins at Game at $1.00 | $5,000 |
| Celebrity B's Lucky Bunch | 50 plays of Celebrity B's latest game at $.25 | $200 |
| Celebrity C's Video Poker hands | 50 plays of video poker 100 | $100 |

*FIG. 8*

TRADING AND SELLING EARNED BONUS GAMES

BACKGROUND

A casino environment may include electronic gaming machines (EGMs). EGMs may include various game play features. Such game play features may include providing wagering credit prizes or bonus prizes. Wagering credit prizes or bonus prizes may be awarded based on the type or content of the prizes. For example, a wagering credit prize and/or a bonus prize may be fixed in terms of how and when such awards are provided.

Player interest in gaming devices may benefit from providing diverse and varied experiences.

BRIEF SUMMARY

According to some embodiments, a system includes a processor circuit and a memory having machine-readable instructions. When executed by the processor circuit, the machine-readable instruction cause the processor circuit to receive a wager for a wagering game at an electronic gaming machine (EGM), receive, from the EGM, an indication that a first player of the EGM has won multiple bonus game plays, and receive, from the first player and via the EGM, an offer to sell the bonus game plays to a second player.

According to some embodiments, a gaming device includes a display device, an input device, a processor circuit, and a memory. The memory includes machine-readable instructions that, when executed by the processor circuit, cause the processor circuit to receive from a first player and via the input device, a wager for a wagering game at an electronic gaming machine (EGM), receive an indication that the first player of the EGM has won multiple bonus game plays and receive, from the first player, an offer to sell a portion of the bonus game plays. The processor circuit is further operable to receive an acceptance message from a second player indicating that the second player will buy the portion of the bonus game plays and responsive to receiving the acceptance message, to transfer the portion of the bonus game plays to the second player.

According to some embodiments, a method includes receiving, from a first player and via an electronic gaming machine (EGM), an indication that the player of the EGM has won multiple bonus game plays, receiving, from the first player and via the EGM, an offer to sell the bonus game plays to a second player, and receiving an acceptance message from the second player indicating agreement to buy the bonus game plays. Operations may further include receiving, from the second player, an offer to sell a portion of the bonus game plays and receiving an acceptance message from a third player indicating that the third player will buy the portion of the bonus game plays from the second player.

BRIEF DESCRIPTION OF SEVERAL VIEWS OF THE DRAWINGS

FIG. 8 is a schematic block diagram illustrating a user interface for accessing outcome events and/or bundles thereof according to some embodiments.

DETAILED DESCRIPTION

The present disclosure may describe how a person could sell game plays (outcomes) as a bundle to other players. Some embodiments provide that a celebrity and/or influencer may sell branded game play that includes video of the celebrity during the game play, however, embodiments are not so limited. This may allow fans and/or followers to participate in exclusive social events with their favorite celebrity and allows celebrities and casinos to generate additional revenue. In some embodiments, the celebrity or other person may sell 100 spins of a slot game that may include personalized videos celebrating the player's wins.

In some embodiments, players could win a bonus or free spin and choose to sell the free spins or bonus rather than play them.

Some embodiments provide that a person who hits a free spin bonus may choose to save the free spins and later trade or sell them on an open market for money or other considerations.

Figure 3:
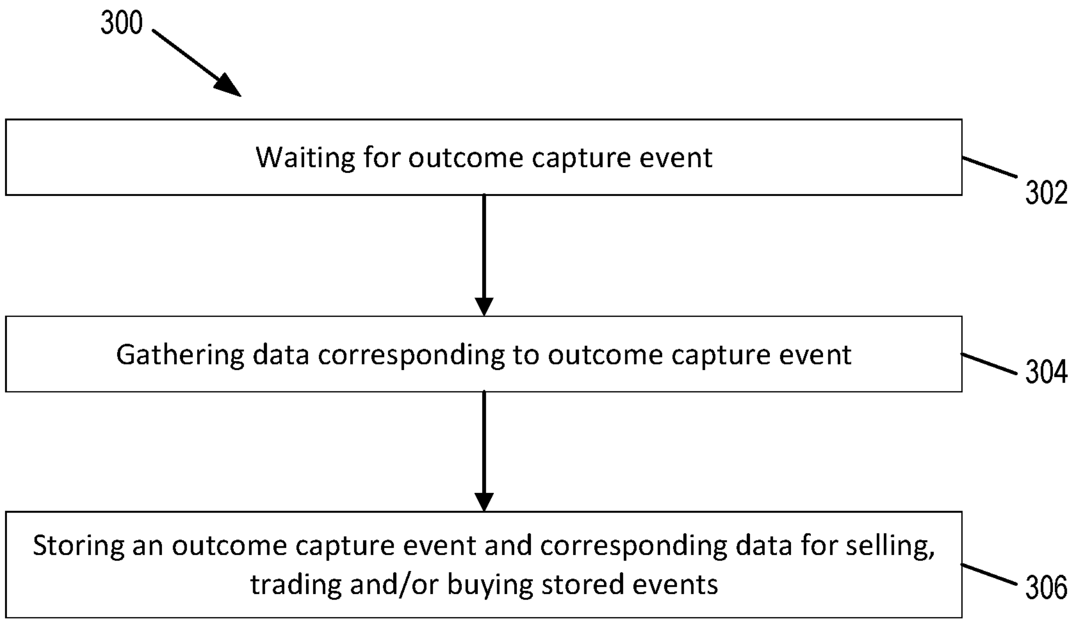
FIG. 3 is a block diagram illustrating operations in a basic flow of saving outcomes according to some embodiments.

Reference is now made to FIG. 3, which is a block diagram 300 illustrating operations in a basic flow of saving outcomes according to some embodiments. Some embodiments provide that operations include waiting for an outcome capture event (block 302). An example of an outcome capture event may include free spins that may be won by a player while playing an EGM. Another example of an outcome capture event may include multiple bonus game plays that may be won by a player while playing an EGM and sold or otherwise transferred to another player. In some embodiments, operations may include a free spin trigger from playing games.

Operations may include gathering data (block 304) corresponding to an outcome capture event. Some embodiments provide that no data is collected at gathering data operations. According to some examples, first player plays a slot machine and wins 15 free spins. The first player may choose to not play those spins and save the spins using, for example, an interface at the EGM. In this manner, the free spins may be saved in a data repository such as one that is associated with a casino or other wagering premises. A second player may see the free spins. For example, the free spins may be visible to the second player. An example may include "15 free spins of the new Lucky Larry slot game"), among others. The example provides that the denomination played was $1 and the expected value of those free spins is $72.50. The second player agrees to buy the free spins for $75. In some embodiments, the second player may decide to use the free spins and play them with an outcome greater than the $75 paid. In this example, free spins were used so the wager for them was already paid by the first player.

Operations may further include storing (block 306) an outcome capture event and corresponding data to allow selling, trading and/or buying the stored events.

In some embodiments, an outcome capture event may include a game trigger such as free spins. Some embodiments provide that an outcome capture event may include a game start that provides that the entire game may be captured. In some embodiments, a series of games may be captured. In some embodiments, the outcome capture event may be a player's choice among multiple different events.

In some embodiments, a celebrity or influencer may save game plays to sell to fans or followers at a later date. In such embodiments, the influencer or follower is not playing the games, but rather selling "bundles" of celebrity branded game plays that have additional value because they are associated with a celebrity or influencer. In this manner, branded celebrity game play bundles may be sold to fans or followers.

Some embodiments provide that data may be added to the events and/or games based on the market value corresponding to a celebrity or influencer. In some embodiments, a captured game event may be available for purchase and/or sale in the event marketplace. In some embodiments, game events may correspond to specific themes and/or types.

In some embodiments, the captured game event may further include game play elements that correspond to the celebrity and/or follower. For example, game elements may be replaced with images corresponding to the celebrity or follower. Such example, celebrity image may replace one or more symbols that would otherwise be part of the gameplay. Although described thus far as celebrity or follower, some embodiments provide that the player may be fan particular corporate entity, sports team, political movement and food or drink type and/or brand. In this manner, significant value can be provided to players as nonmonetary awards.

In some embodiments, data corresponding to a stored outcome capture event may include information about the expected value of the outcome(s), information about the theoretical payback of the outcome(s), video(s) and/or audio clip(s) from the person saving the outcome, a wager of the outcome(s), denomination of the outcome(s), and/or the number of outcomes being stored, such as 100 free plays and/or 100 game plays for example. Data corresponding to a stored outcome capture event may further include the state of the outcome such as whether or not the outcomes have been played/redeemed or not and whether or not the wager was included in them or not.

In some embodiments, the storage of the capture event may be provided in a simple cloud/web service, a casino system, an online gaming system, nonfungible tokens (NFT), and/or a blockchain, among others.

Figure 4:
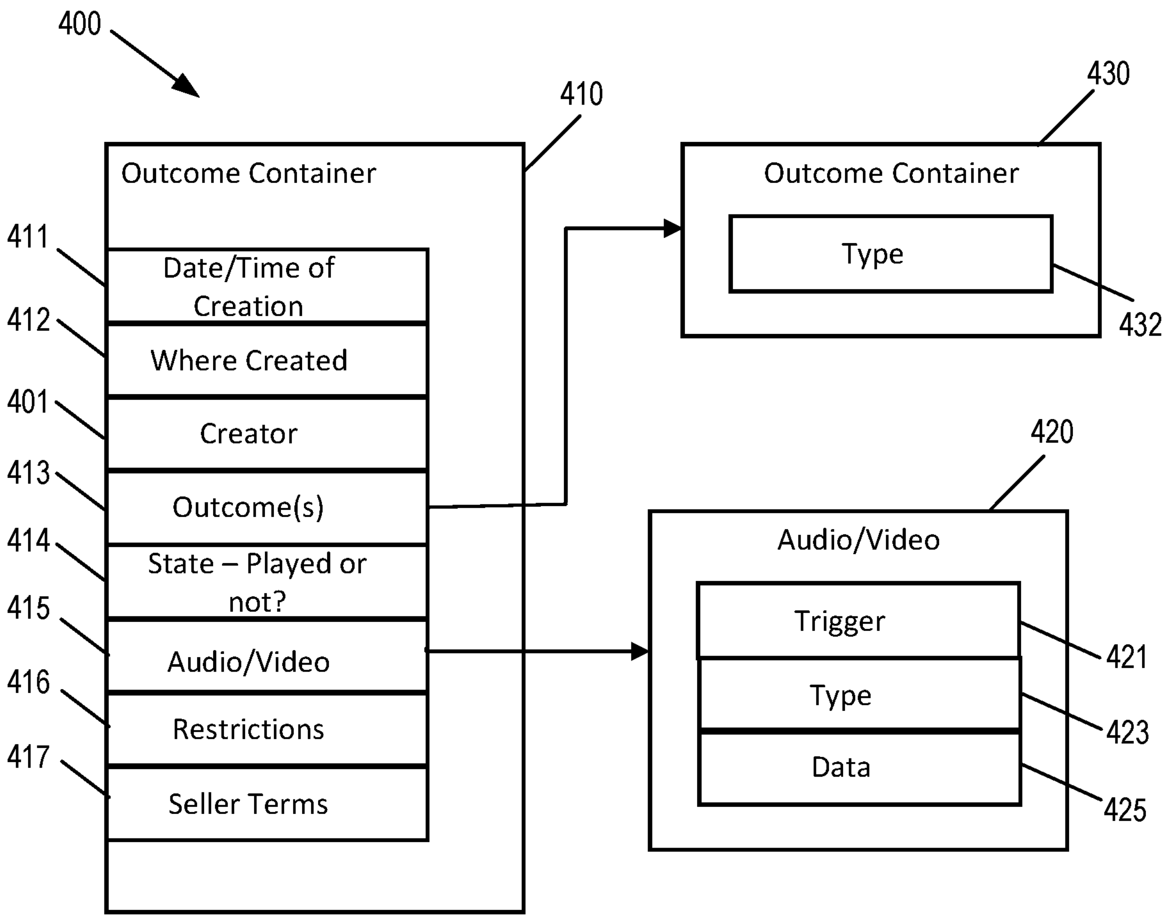
FIG. 4 is a block diagram illustrating data corresponding to a stored outcome event according to some embodiments.

Reference is now made to FIG. 4, which is a block diagram illustrating data corresponding to a stored outcome event according to some embodiments. In some embodiments, the stored outcome event data may be stored in an outcome data container 400. The outcome data container 400 has the list of outcomes.

Embodiments may also include a list of audio/video triggers 420. The audio and/or video triggers indicate what triggers the audio and/or video. In some embodiments, the data of the audio and/or video and/or links (e.g., URLs) for the audio and/or video to be played when the trigger happens.

The outcome data container 400 may include data corresponding to the time/date of creation 411 of the stored outcome capture event, a location 412 that identifies where the stored outcome capture event was created, identity of the creator 411, to the corresponding to one or more outcomes 413, the state 414 of the stored outcome capture event including whether or not the outcomes have been played, audio and/or video data 415, the restrictions 416 on usage of the stored outcome capture event, and/or seller terms 417 that may impose restrictions and/or requirements corresponding to the sale. For example, the outcome data container 400 may include restrictions, such as a time restriction or restriction to play a certain theme or certain wager amount.

In some embodiments, the data storage container 400 may further include an outcome type 430 identifies the type of stored outcome capture event. In some embodiments, audio and/or video content 420 may include a description corresponding to an event trigger 412, a type 423 of audio and/or video trigger that corresponds to the stored outcome capture event, and the audio and/or video data 425 corresponding to the stored outcome capture event.

In the context of embodiments based on celebrity brand value, celebrity may sell a batch of plays of outcome capture events. Value to the buyer would be provided by the celebrity posting to social media on behalf of the buyer. In some embodiments, the audio and/or video content may include the celebrity mentioning the player in the public environment such as social network. In some embodiments, a bundle of games may be associated with the celebrity. In some embodiments, the outcome capture event may be stored in a NFT and may be tradable.

Some embodiments provide that the player has a special status in order to qualify to purchase the bundle. In some embodiments, the purchase option may be limited to status based on membership in a rewards program or other club. In some embodiments, the audio and/or video content may customized to the player that purchased the bundle. In some embodiments, the audio and/or video content is delivered and/or played to the player based on certain preidentified events while redeeming the bundle.

In some embodiments, seller terms may define the conditions for which the seller is willing to sell the outcomes. For example, a celebrity may agree to sell 100 plays of a video slot game at a $1.00 per spin resulting in $100 in total wager. Based on the value corresponding to her celebrity, she may be willing to sell those for $1000, or to auction them off for a minimum of $1000. The celebrity might also assign a certain number of these outcomes, such as limiting them to just 10 such that only 10 can be sold, thus yielding exclusivity.

In some embodiments, the restriction may be to limit the purchase to certain loyalty club members or that have certain restrictions by loyalty club level (gold, silver, etc.)

In some embodiments, the restriction could be to limit the purchase to only people who are a member of the sellers (the celebrity) fan club or follow, subscribe or like the content of the seller. Some embodiments may provide that the seller terms and/or the data includes a commission for the operator, manufacturer, sponsor, manufacturer and/or the casino such as $10 or 5%, thus creating additional revenue for the casino for offering this feature.

As provided above, in some embodiments, a celebrity may save 100 plays of a slot game. Based on the celebrity brand value, the outcomes may sell for more than the expected value. For example, the 100 plays might be expected to yield $72, but because they are from the celebrity people might pay much more than the $72. The celebrity can record one or more video and/or audio clips to go with the plays. For example, she might record an introductory video such as "Congratulations on getting my special 100 plays of the new Lucky Larry slot game. Good Luck!". She might record a second video that happens after 50 plays such as "Keep going! I know you can win this!". The person who redeems the outcome sees the videos and may have a powerful social media experience.

Figure 5:
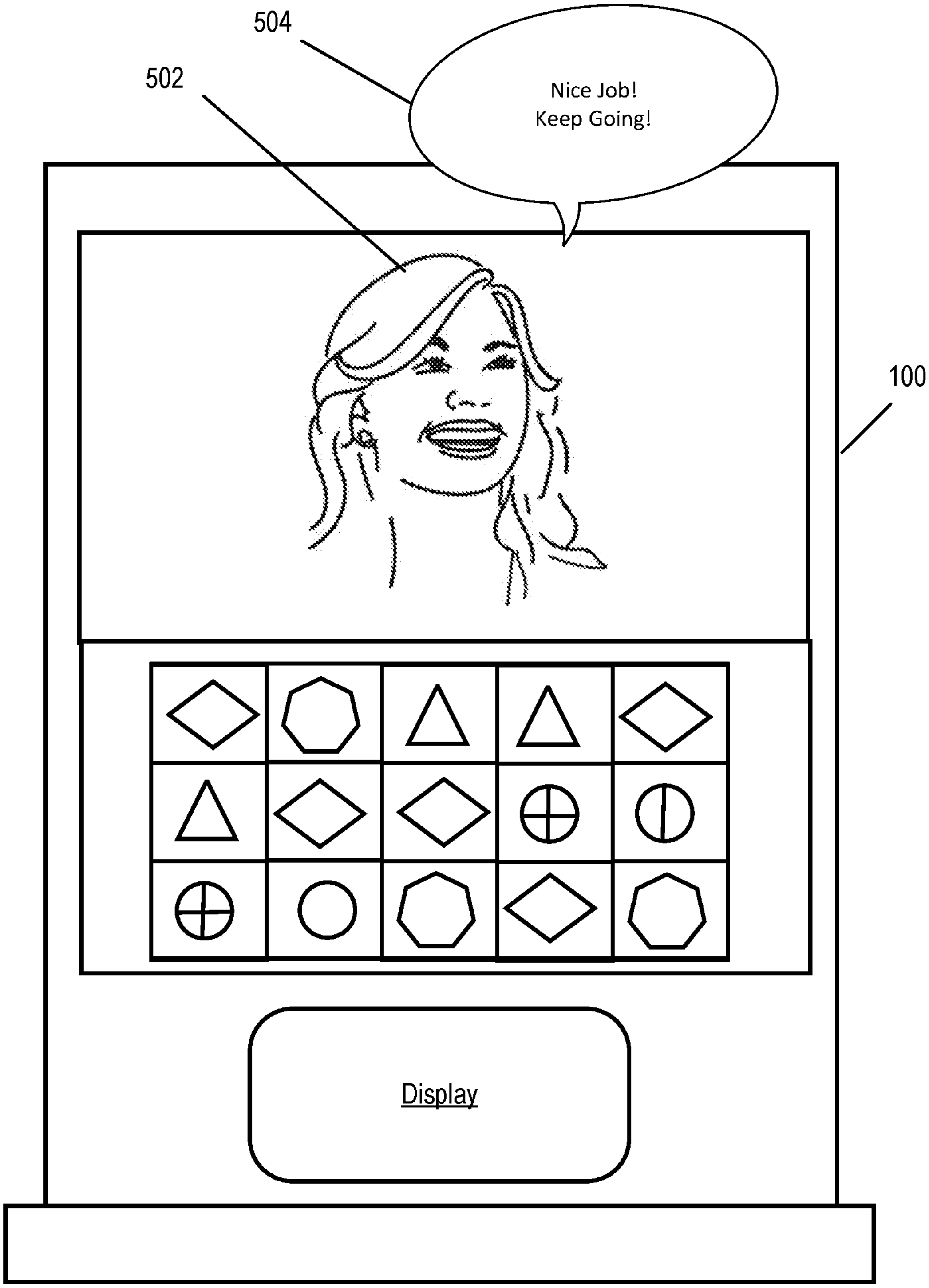
FIG. 5 is a block schematic diagram illustrating an EGM displaying one or more video, audio and/or text messages that are associated with the celebrity according to some embodiments.

Brief reference is now made to FIG. 5, which is a block schematic diagram illustrating an EGM 100 displaying one or more video, audio and/or text messages that are associated with a celebrity. As illustrated, the EGM 100 may be used to present celebrity content that is associated with one or more of the plays or events of the outcomes. For example, the celebrity 502 may record a "Wow!" audio clip that is played when a spin of the slot game wins and/or wins more than a predefined amount.

Figure 6:
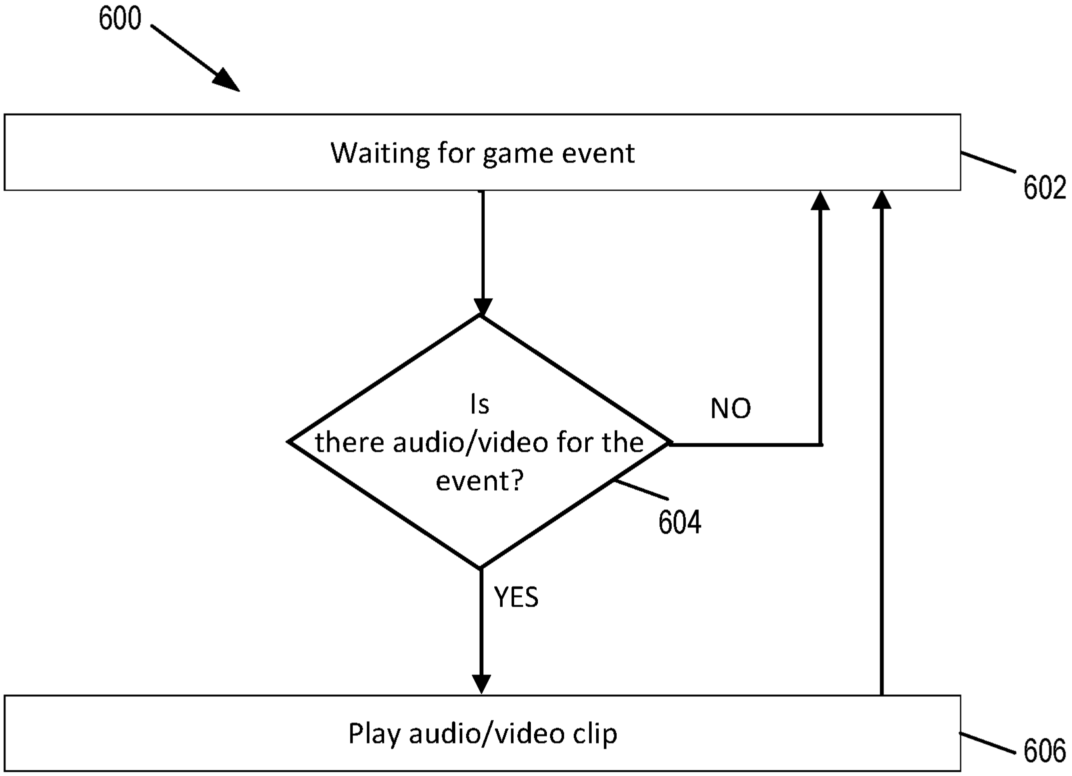
FIG. 6 is a schematic block diagram illustrating operations for playing celebrity and/or influencer audio/video clips in response to game events according to some embodiments.

Brief reference is now made to FIG. 6, which is a schematic block diagram illustrating operations for playing celebrity and/or influencer audio/video clips in response to game events. In some embodiments, operations include waiting (block 602) for a game event to occur. Some embodiments provide that game events may include a game start or stop, a specific game start such as a first or last game, a win or loss, a win over a certain amount, and/or a win of a certain type, such as a bonus game win and/or a free spin, among others.

If it is determined (block 604) that there is audio and/or video for the event, the operations include playing (block 606) the audio and/or video clip. Once the audio and/or video event has played, operations may resume waiting (block 602) for another game event.

Figure 7:
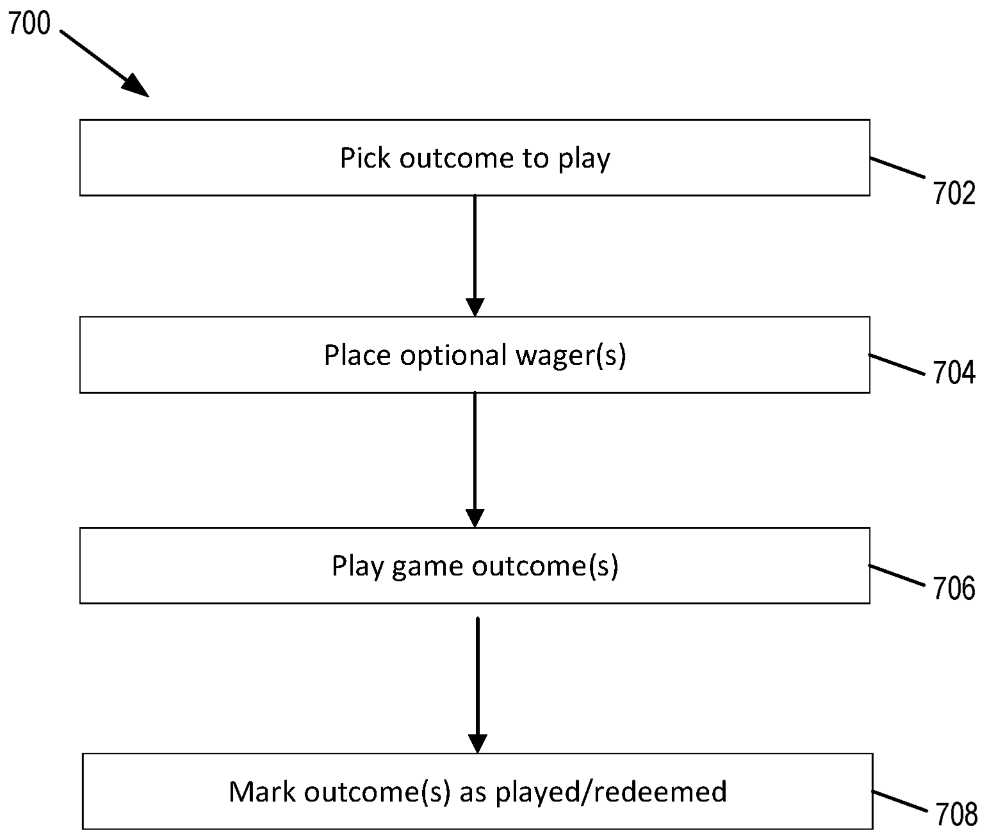
FIG. 7 is a schematic block diagram illustrating operations for redeeming stored outcomes according to some embodiments.

Brief reference is now made to FIG. 7, which is a schematic block diagram illustrating operations for redeeming stored outcomes according to some embodiments. Operations include picking (block 702) an outcome to play. Some embodiments provide that an optional wager may be placed (block 704) regarding the outcome. The outcome may be played (block 706) and the outcomes may be marked (block 708) as played and/or redeemed.

Some embodiments provide that the outcomes may be stored. In some embodiments, the outcome bundles may be stored on a blockchain and/or as NFTs. In some embodiments, the outcome bundles may be openly traded on the free market using a blockchain technology. To redeem the outcomes the player might visit an EGM or other type of terminal and may scan a code, such as a QR code, and provide credentials to prove they own the outcomes. In some other embodiments, a player may redeem the plays on a mobile application and/or web browser in which the player provides proof that they own the outcome by providing the credentials and/or proving they hold the private key.

In some embodiments, it may be possible to play the bundle and/or use the spins in the bundle and for the player to place wagers in addition to the purchase of the bundle.

In one embodiment, during the playing of the bundle, the player is shown some branding or indication of the bundle such as text or graphics on the screen showing "You are playing Celebrity's 100 spins". In some embodiments, the display also likely shows the number of spins left in the bundle.

In some embodiments, after the outcomes are used, the owner of the outcomes may be given the ownership of the celebrity videos. For example, a player buys Celebrity's 100 spins as an NFT. The player then plays the spins and, while playing, there are multiple videos of Celebrity celebrating "Nice Win!", "Good luck and Merry Christmas" and "That's my favorite thing". After that the ownership of the multiple videos may be transferred to the player by transferring the NFT of those videos to the player.

Reference is now made to FIG. 8, which is a schematic block diagram illustrating a user interface for accessing outcome events and/or bundles thereof. In some embodiments, the user interface 800 may be provided in an EGM display, service window, browser and/or mobile application that may display the player possible outcome bundles. Those bundles might be offered for sale and/or may be auctioned. With each bundle the user interface 800 may show the customer the description (block 810), the terms (block 820) and/or the price (block 830) among others. In some embodiments, the user interface may include additional information such as a wager amount, a denomination of the wager, a theme, a timeline, number of plays, and/or expected return, among others. For example, the user interface 800 may show that Celebrity A is offering a limited Christmas game outcome of 100 spins of a new theme at $5 per spin, costing $5,000. The user interface 800 may provide that this offer is limited to 10 people and only until Christmas. In some embodiments, the user interface may include some description of the video/audio such as "Celebrity A offers you her holiday greetings in 3 Christmas themed videos."

Other user interface 800 data and/or information may be presented therethrough. For example, the player might select one item in the list and see many more details such as expiration date, eligible themes, eligible cabinets and/or bidding options (if the item is auctioned), among others. The player may also have the user interface 800 to purchase and/or bid on the items. In this example the user interface 800 shows "Celebrity A" three times because 3 are available. However, in other embodiments it could be shown just once with an indication that 3 are available.

In some embodiments, the user interface 800 may include things tailored to sales such as a logo and/or image of Celebrity A next to the offer.

In some embodiments, the player may be required to be a club member in a Celebrity A related club to buy the outcome bundle.

Some embodiments herein provide a player to participate in the social media world where people want visibility and want to belong to a group. Many times, being a follower of an influencer may be a power motivator since it may increase social media visibility, and it may allow the player to feel that they are part of a group.

In some embodiments, when a player purchasing and/or using the outcome bundle, information may be posted on a social media site automatically. Some embodiments provide that the information could be posted on the purchaser's social media and/or the influencer's social media. This could be a term of the purchase and/or even may cost an additional fee. For example, Player A buys Celebrity A's game plays for $3000. Player A may pay an extra $1000 so that when the spins are complete a post shows up on Celebrity A's social media feed.

In some embodiments, the celebrity outcome package may contain graphics (or sounds and/or videos) that may be used to replace the game graphics with the celebrity provided graphics. For example, Celebrity A may replace the cherry symbol on slot reels with an image of herself. In some embodiments, the images and sounds to be replaced may be stored in the outcome bundle in the cloud or NFT.

Figure 1:
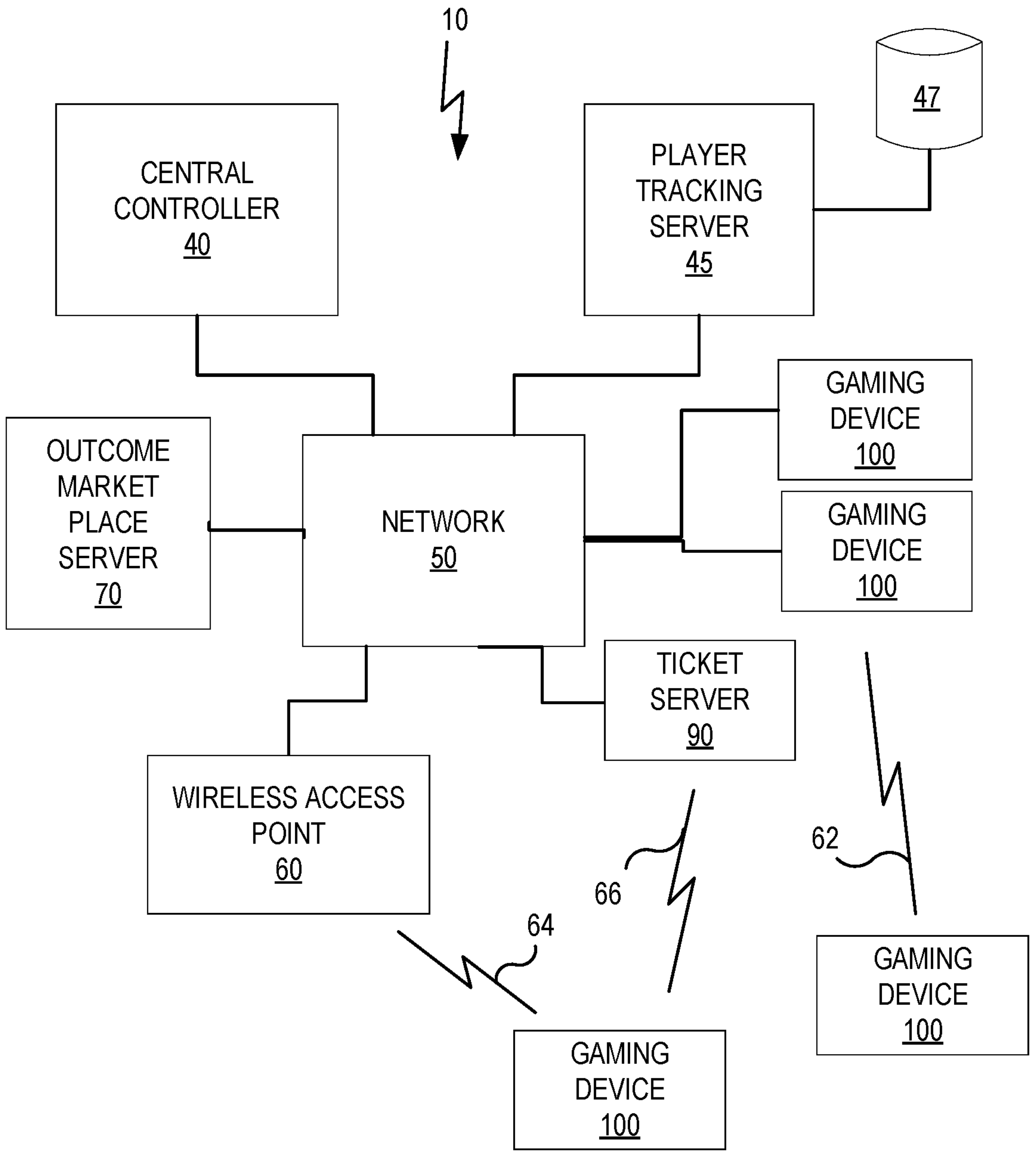
FIG. 1 is a schematic block diagram illustrating a network configuration for a plurality of gaming devices according to some embodiments.

Referring now to FIG. 1, a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
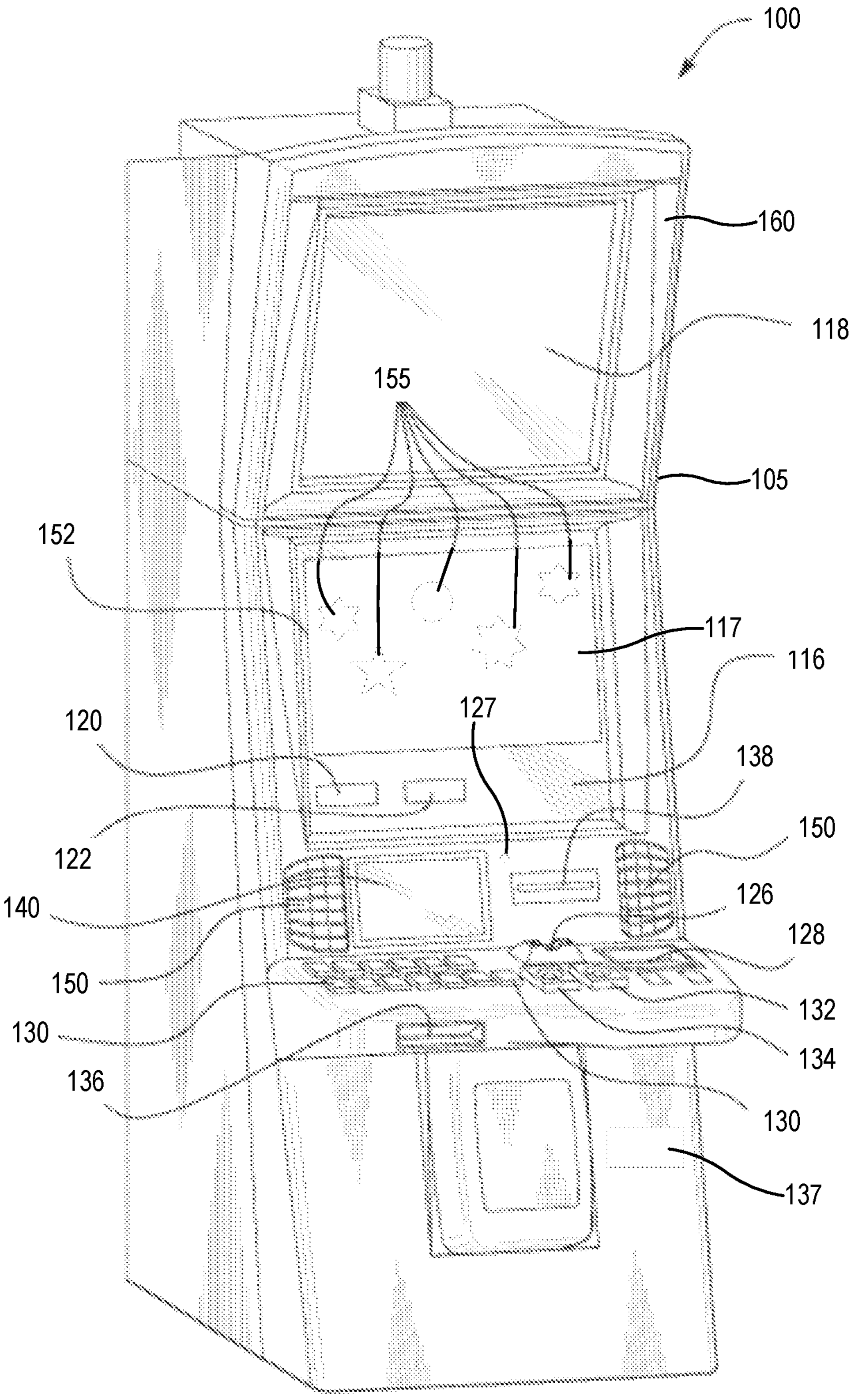
FIG. 2A is a perspective view of a gaming device that can be configured according to some embodiments.
Figure 2B:
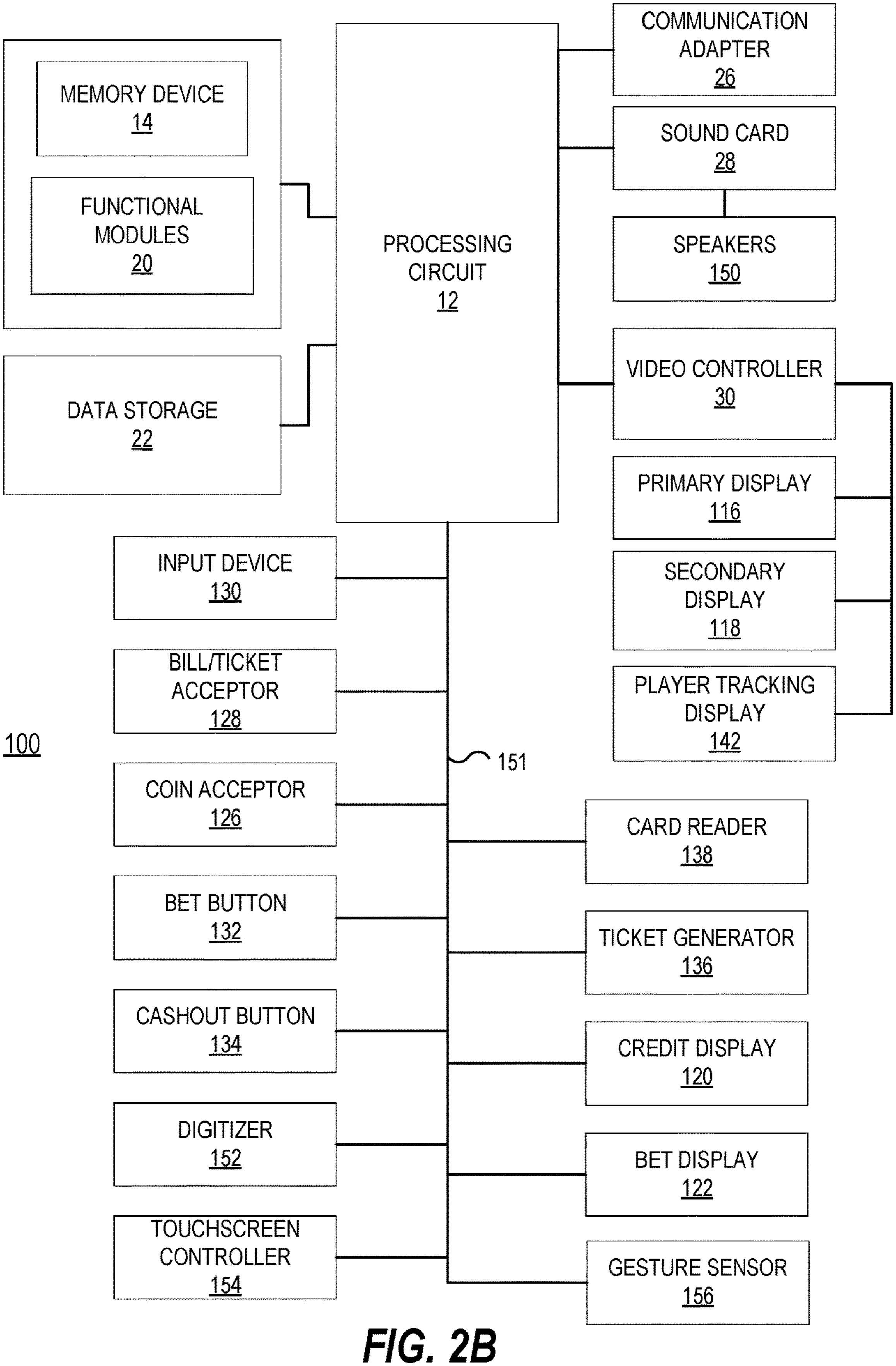
FIG. 2B is a schematic block diagram illustrating an electronic configuration for a gaming device according to some embodiments.
Figure 2C:
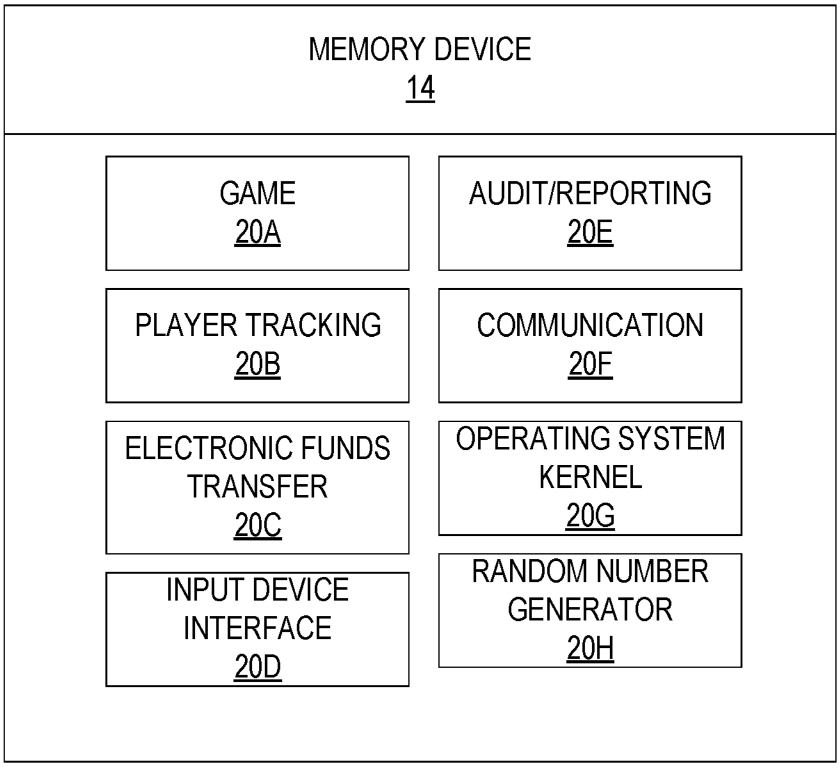
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28

(FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
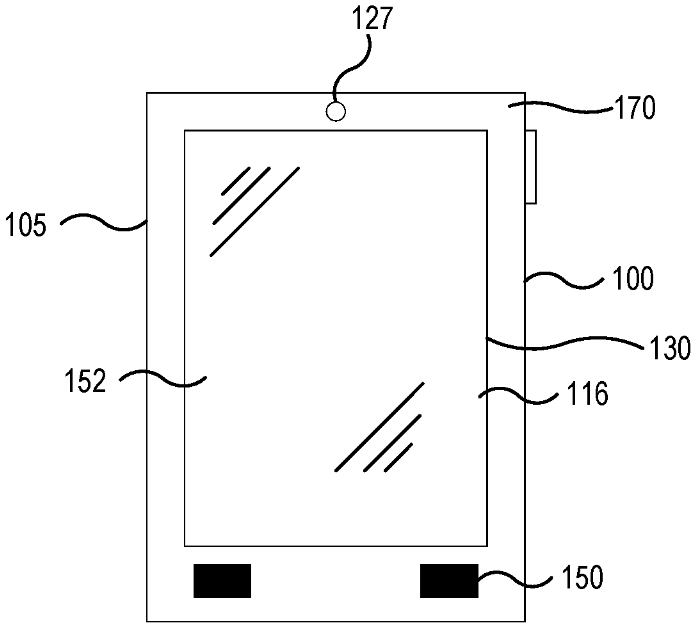
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
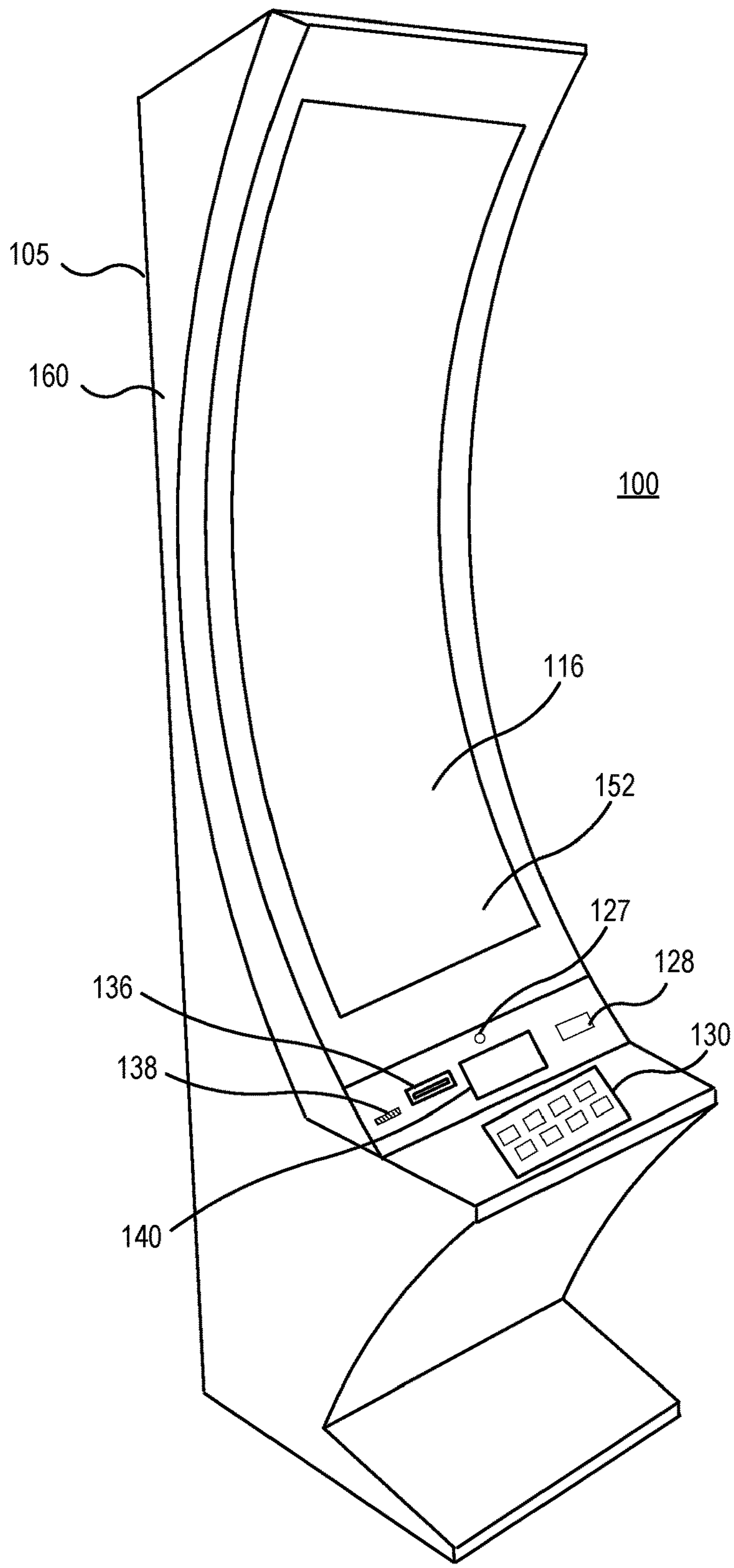
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 9:
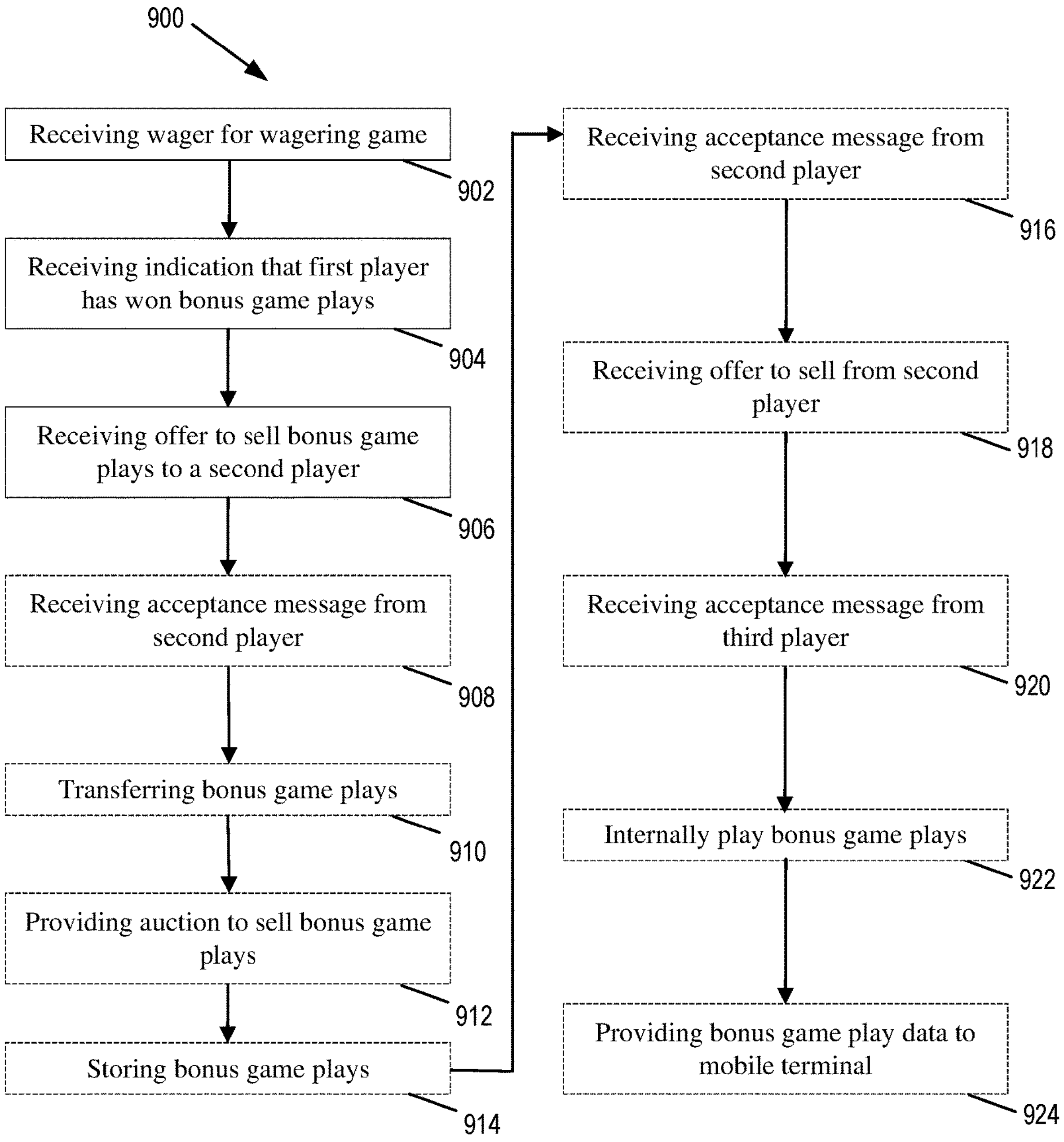
FIG. 9 is a flowchart illustrating operations of a system that includes a processor circuit and a memory including machine-readable instructions according to some embodiments.

Reference is now made to FIG. 9, which is a flowchart illustrating operations of a system that includes a processor circuit and a memory including machine-readable instructions that, when executed by the processor circuit, cause the processor circuit to perform operations of receiving (block 902) a wager for a wagering game at an electronic gaming machine (EGM) and receiving (block 904), from the EGM, an indication that a first player of the EGM has won multiple bonus game plays. Some embodiments provide that the bonus game plays may include free spins and/or game plays corresponding to different games and/or game types.

Operations may include receiving (block 906), from the first player and via the EGM, an offer to sell the bonus game plays to a second player.

Operations may include transferring (block 908) the bonus game plays.

Operations may include receiving (block 910) an acceptance message from the second player indicating that the second player will buy the bonus game plays. Some embodiments provide that, in response to receiving the acceptance message, the processor circuit is caused to transfer the bonus game plays to the second player. In some embodiments, the bonus game plays may be transferred to a digital data repository such as, for example, a digital wallet and/or other account.

Some embodiments provide that, in response to receiving the offer to sell the bonus game plays to the second player, the processor circuit may provide (block 912) an auction that is configured to sell the bonus game plays to a highest bidder. In some embodiments, the auction is configured to sell the bonus game plays as portions of the total bonus game plays to multiple different players. After transferring the bonus game plays, the bonus game plays may be stored (block 914) in a data repository that is accessible to the second player. In some embodiments, transferring the bonus game plays may include transferring the bonus game plays from a first digital wallet of the first player to a second digital wallet of the second player.

In some embodiments, the offer to sell the bonus game plays includes a representation of a value of the bonus game plays. Some embodiments provide that the representation of the value of the bonus game plays includes a per unit cost of one of the bonus game plays multiplied by a quantity of bonus game plays in the multiple bonus game plays.

In some embodiments, the representation of the value of the multiple bonus game plays includes an expected return based on a statistically determined value that corresponds to expected performance of the bonus game plays.

Some embodiments include a third player. In such embodiments, operations include receiving (block 916) an acceptance message from the second player indicating that the second player will buy the bonus game plays and receive (block 918), from the second player, an offer to sell a portion of the bonus game plays. In such embodiments, operations may include receiving (block 920) an acceptance message from the third player that the third player will buy the portion of the bonus game plays.

In some embodiments, before transferring the plurality of bonus game plays, the processor circuit is caused to: internally play (block 922) the bonus game plays and preserve played bonus game data corresponding to internally played ones of the bonus game plays Bonus game data may be provided (block 924) the bonus game data to a mobile terminal of the second player. Some embodiments provide that the internally played ones of the bonus game plays are playable by the mobile terminal. In some embodiments, the internally played ones of the plurality of bonus game plays are playable at a location that is remote from the EGM based on the played bonus game data.

In some embodiments, the bonus game plays are playable at any time after the bonus game plays have been transferred to the second player based on the played bonus game data.

Some embodiments provide that the EGM is a first type of EGM and that the bonus game plays are playable on the first type of EGM and on a second type of EGM that is different from the first type of EGM.

In some embodiments, the bonus game plays include a first type of bonus game plays that is exchangeable for a second type of bonus game plays that is different from the first type of bonus game plays. In some embodiments, each of the bonus game plays includes the first type of bonus game plays that includes a first value and the second type of bonus game plays that includes a second value that is different from the first value.

Figure 10:
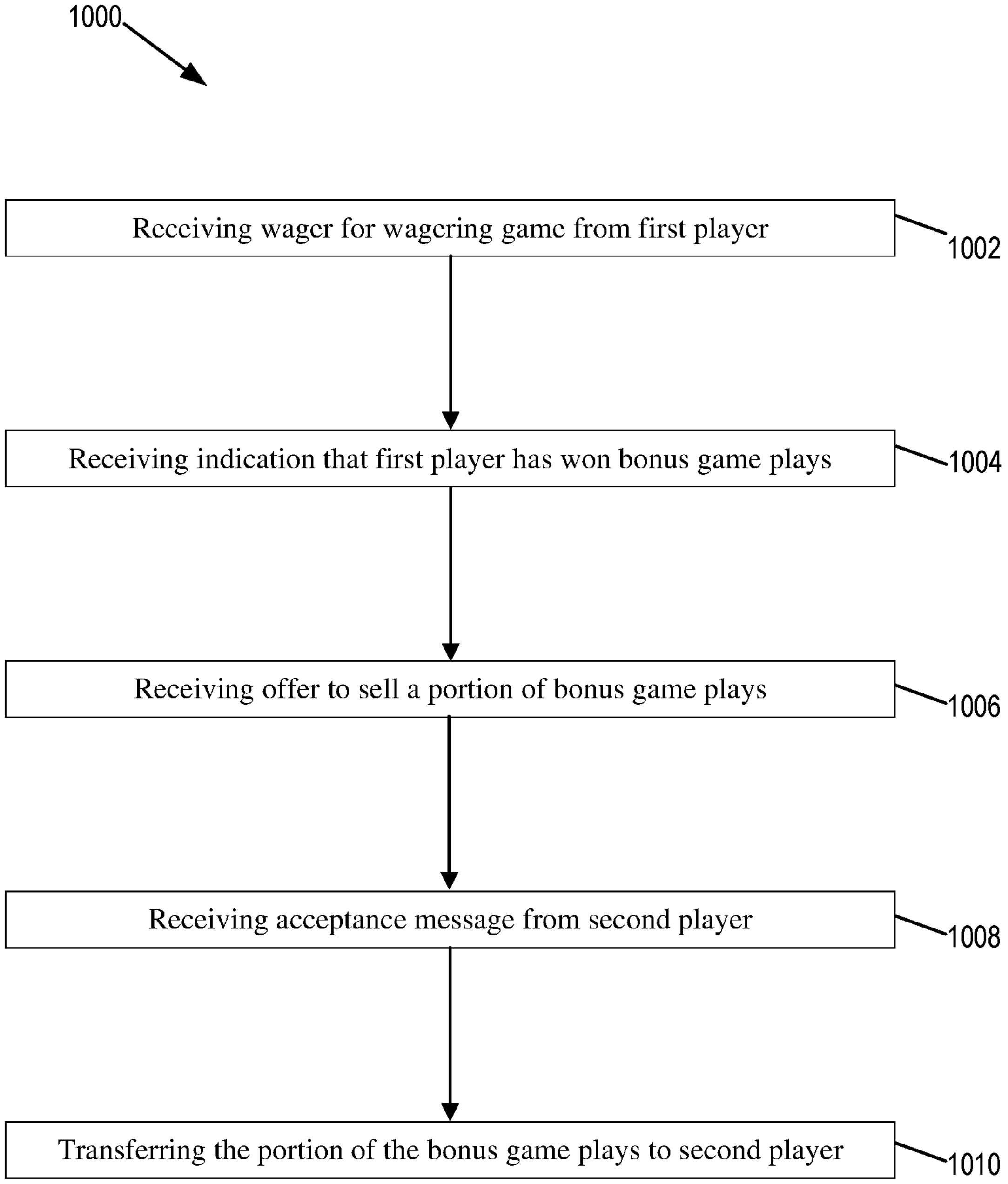
FIG. 10 is a flowchart illustrating operations of a gaming device according to some embodiments.

Reference is now made to FIG. 10, which is a flowchart 1000 illustrating operations of a gaming device that includes a display device, an input device, a processor circuit, and a memory including machine-readable instructions that, when executed by the processor circuit, cause the processor circuit to receive (block 1002) from a first player and via the input device, a wager for a wagering game at an electronic gaming machine (EGM) and receive (block 1004) an indication that the first player of the EGM has won multiple bonus game plays. The processor circuit is further operable to receive (block 1006), from the first player, an offer to sell a portion of the bonus game plays and to receive (block 1008) an acceptance message from a second player indicating that the second player will buy the portion of the bonus game plays. The processor circuit is further caused to, responsive to receiving the acceptance message, transfer (block 1010) the portion of bonus game plays to the second player.

Figure 11:
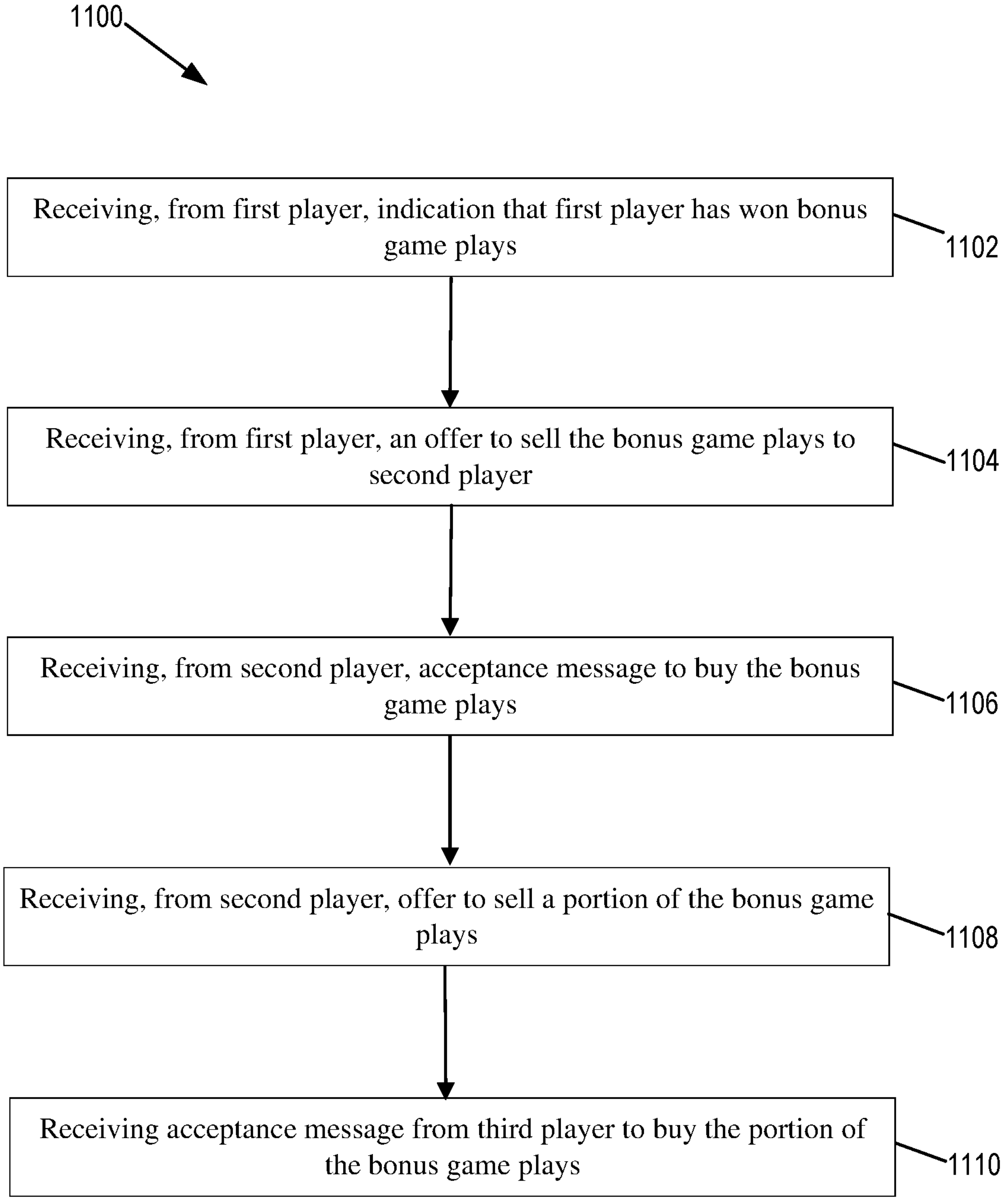
FIG. 11 is a flowchart illustrating operations according to some methods according to some embodiments.

Reference is now made to FIG. 11, which is a flowchart illustrating operations according to some methods provided herein. Operations may include receiving (block 1102), from a first player and via an electronic gaming machine (EGM), an indication that the player of the EGM has won multiple bonus game plays and receiving (block 1104), from the first player and via the EGM, an offer to sell the plurality of bonus game plays to a second player. Operations may further include receiving (block 1106) an acceptance message from the second player indicating agreement to buy the bonus game plays and receiving (block 1108), from the second player, an offer to sell a portion of the bonus game plays. Operations may further include receiving (block 1110) an acceptance message from a third player indicating that the third player will buy the portion of the plurality of bonus game plays from the second player.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit." "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks. Blocks as used herein may include dashed lines to indicated that a corresponding operation and/or structure may be optional to various embodiments.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A system comprising:
- a processor circuit; and
- a memory comprising machine-readable instructions that, when executed by the processor circuit, cause the processor circuit to:
- receive a wager for a wagering game at an electronic gaming machine (EGM);
- receive, from the EGM, an indication that a first player of the EGM has won a plurality of bonus game plays;
- determine, using pay table data, applicable game rules, and random number generator output of the EGM, an expected return based on a statistically determined value that corresponds to expected performance of the plurality of bonus game plays; and
- receive, from the first player and via the EGM, an offer to sell the plurality of bonus game plays to a second player, wherein the offer to sell comprises the expected return.

2. The system of claim 1, wherein the processor circuit is further caused to receive an acceptance message from the second player indicating that the second player will buy the plurality of bonus game plays.

3. The system of claim 2, wherein, responsive to receiving the acceptance message, the processor circuit is caused to transfer the plurality of bonus game plays to the second player.

4. The system of claim 3, wherein after transferring the plurality of bonus game plays, the processor circuit is further caused to store the plurality of bonus game plays in a data repository that is accessible to the second player.

5. The system of claim 3, wherein transferring the plurality of bonus game plays comprises transferring the plurality of bonus game plays from a first digital wallet of the first player to a second digital wallet of the second player.

6. The system of claim 3, wherein before transferring the plurality of bonus game plays, the processor circuit is caused to: internally play the plurality of bonus game plays and preserve played bonus game data corresponding to internally played ones of the plurality of bonus game plays; and provide the bonus game data to a mobile terminal of the second player, wherein the internally played ones of the plurality of bonus game plays are playable by the mobile terminal.

7. The system of claim 6, wherein the internally played ones of the plurality of bonus game plays are playable at a location that is remote from the EGM based on the played bonus game data.

8. The system of claim 6, wherein the plurality of bonus game plays are playable at any time after the plurality of bonus game plays have been transferred to the second player based on the played bonus game data.

9. The system of claim 6, wherein the EGM comprises a first type of EGM, wherein the plurality of bonus game plays are playable on the first type of EGM and on a second type of EGM that is different from the first type of EGM.

10. The system of claim 6, wherein the plurality of bonus game plays comprise a first type of bonus game plays that is exchangeable for a second type of bonus game plays that is different from the first type of bonus game plays.

11. The system of claim 10, wherein each of the plurality of bonus game plays comprising the first type of bonus game plays comprises a first value, and wherein each of the second type of bonus game plays comprises a second value that is different from the first value.

12. The system of claim 2, further comprising a third player, wherein the processor circuit is further caused to:

receive an acceptance message from the second player indicating that the second player will buy the plurality of bonus game plays;

receive, from the second player, an offer to sell a portion of the plurality of bonus game plays; and receive an acceptance message from the third player that the third player will buy the portion of the plurality of bonus game plays.

13. The system of claim 1, wherein in response to receiving the offer to sell the plurality of bonus game plays to the second player, the processor circuit is further caused to provide an auction that is configured to sell the plurality of bonus game plays to a highest bidder.

14. The system of claim 13, wherein the auction is configured to sell the plurality of bonus game plays as portions of the plurality of bonus game plays to a plurality of players.

15. The system of claim 1, wherein the plurality of bonus game plays comprises a plurality of free spins that the second player is allowed to play responsive to the plurality of bonus game plays being transferred to the second player.

16. The system of claim 1, wherein the offer to sell the plurality of bonus game plays comprises a representation of a value of the plurality of bonus game plays that is different from the expected return.

17. The system of claim 16, wherein the representation of the value of the plurality of bonus game plays comprises a per unit cost of one of the plurality of bonus game plays multiplied by a quantity of bonus game plays in the plurality of bonus game plays.

18. A gaming device comprising:

an input device;

a processor circuit; and a memory comprising machine-readable instructions that, when executed by the processor circuit, cause the processor circuit to:

receive from a first player and via the input device, a wager for a wagering game at an electronic gaming machine (EGM);

receive an indication that the first player of the EGM has won a plurality of bonus game plays;

determine, using pay table data, applicable game rules, and random number generator output of the EGM, an expected return based on a statistically determined value that corresponds to expected performance of the plurality of bonus game plays;

receive, from the first player, an offer to sell a portion of the plurality of bonus game plays, wherein the offer to sell comprises the expected return;

receive an acceptance message from a second player indicating that the second player will buy the portion of the plurality of bonus game plays; and responsive to receiving the acceptance message, the processor circuit is caused to transfer the portion of the plurality of bonus game plays to the second player.

* * * * *